(12) United States Patent
Swann

(10) Patent No.: US 10,308,353 B2
(45) Date of Patent: Jun. 4, 2019

(54) APPARATUS AND METHODS FOR CONTROLLING VELOCITY OF AIRCRAFT DURING LANDING ROLL-OUT AND/OR TAXIING

(71) Applicant: ROLLS-ROYCE plc, London (GB)

(72) Inventor: Peter Swann, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 336 days.

(21) Appl. No.: 15/097,975

(22) Filed: Apr. 13, 2016

(65) Prior Publication Data

US 2016/0325826 A1 Nov. 10, 2016

(30) Foreign Application Priority Data

May 6, 2015 (GB) .................................. 1507705.0

(51) Int. Cl.
*B64C 25/40* (2006.01)
*B64C 25/34* (2006.01)
*B64C 25/46* (2006.01)
*B64D 41/00* (2006.01)
*B64C 25/42* (2006.01)

(52) U.S. Cl.
CPC ............ *B64C 25/405* (2013.01); *B64C 25/34* (2013.01); *B64C 25/42* (2013.01); *B64C 25/46* (2013.01); *B64D 41/00* (2013.01); *B64D 2205/00* (2013.01); *B64D 2221/00* (2013.01); *Y02T 50/823* (2013.01)

(58) Field of Classification Search
CPC ....... B64C 25/34; B64C 25/405; B64C 25/42; B64C 25/46; B64D 41/00; B64D 2201/00; B64D 2205/00; Y02T 50/823

USPC ........................................................... 244/58
See application file for complete search history.

(56) References Cited

U.S. PATENT DOCUMENTS

| 8,204,661 | B2 * | 6/2012 | Godo | B60T 13/74 |
| | | | | 701/3 |
| 9,950,699 | B2 * | 4/2018 | Kanemori | B60T 8/1703 |
| 2005/0224642 | A1 * | 10/2005 | Sullivan | B60L 7/26 |
| | | | | 244/111 |
| 2007/0284939 | A1 * | 12/2007 | Charles | B60T 1/10 |
| | | | | 303/152 |
| 2008/0258014 | A1 * | 10/2008 | McCoskey | B60L 7/10 |
| | | | | 244/221 |

(Continued)

FOREIGN PATENT DOCUMENTS

| EP | 2161829 A2 | 3/2010 |
| EP | 2565119 A1 | 3/2013 |
| FR | 3004699 A1 | 10/2014 |

OTHER PUBLICATIONS

Nov. 6, 2015 Search Report issued in British Patent Application No. 1507705.0.

*Primary Examiner* — Richard R. Green
*Assistant Examiner* — Brady W Frazier
(74) *Attorney, Agent, or Firm* — Oliff PLC

(57) ABSTRACT

Apparatus for controlling velocity of aircraft during landing roll-out and/or taxiing, the apparatus comprising: a generator for absorbing kinetic energy from a landing gear of the aircraft to generate electrical energy; and a component of the aircraft for receiving and consuming electrical energy from the generator, the generator and the component being electrically connected to one another without an intervening electrical energy storage device.

14 Claims, 5 Drawing Sheets

(56) References Cited

U.S. PATENT DOCUMENTS

| | | | | |
|---|---|---|---|---|
| 2009/0076668 A1* | 3/2009 | Lynas | ................... | B64C 25/22 |
| | | | | 701/3 |
| 2009/0218440 A1* | 9/2009 | Dilmaghani | .......... | B64C 25/405 |
| | | | | 244/50 |
| 2010/0170981 A1* | 7/2010 | Belleville | ............... | B64C 25/36 |
| | | | | 244/58 |
| 2012/0292437 A1* | 11/2012 | Garcia | ................. | B64C 25/405 |
| | | | | 244/58 |
| 2013/0087654 A1* | 4/2013 | Seibt | ........................ | B60T 1/10 |
| | | | | 244/50 |
| 2013/0261855 A1* | 10/2013 | DeGagne | ............. | G08G 5/0021 |
| | | | | 701/16 |
| 2013/0327014 A1* | 12/2013 | Moulebhar | ............. | F02K 3/065 |
| | | | | 60/226.2 |
| 2015/0120098 A1* | 4/2015 | Catalfamo | ............... | G08G 5/02 |
| | | | | 701/16 |
| 2015/0204399 A1* | 7/2015 | Schmidt | ............... | B60K 7/0007 |
| | | | | 188/161 |
| 2015/0274285 A1* | 10/2015 | Saito | ........................ | B64C 25/40 |
| | | | | 244/50 |
| 2015/0375855 A1* | 12/2015 | Jaber | ........................ | H02P 3/22 |
| | | | | 318/400.26 |
| 2016/0052642 A1* | 2/2016 | Gordon | ................. | B64D 45/00 |
| | | | | 701/3 |

\* cited by examiner

APPARATUS AND METHODS FOR CONTROLLING VELOCITY OF AIRCRAFT DURING LANDING ROLL-OUT AND/OR TAXIING

TECHNOLOGICAL FIELD

The present disclosure concerns apparatus and methods for controlling velocity of aircraft during landing roll-out and/or taxiing.

BACKGROUND

Aircraft, such as airliners, include a landing gear for supporting the aircraft while it is on the ground. For example, the landing gear may be used for landing and taxiing at an airport. The landing gear usually includes a plurality of wheels and a brake arrangement for reducing the velocity of the aircraft during landing roll-out and/or taxiing.

The use of the brake arrangement may result in wear to the brake linings of the brake arrangement. Such wear incurs cost for the operator of the aircraft.

Additionally, the engines of the aircraft may be arranged to reduce the velocity of the aircraft during landing roll-out by applying reverse thrust (that is, thrust in a direction substantially opposite to the direction of movement of the aircraft). However, the use of reverse thrust may increase fuel use, incur wear on the engines, increase noise and emissions from the engines.

BRIEF SUMMARY

According to various, but not necessarily all, embodiments there is provided apparatus for controlling velocity of aircraft during landing roll-out and/or taxiing, the apparatus comprising: a generator for absorbing kinetic energy from a landing gear of the aircraft to generate electrical energy; and a component of the aircraft for receiving and consuming electrical energy from the generator, the generator and the component being electrically connected to one another without an intervening electrical energy storage device.

The component may comprise at least one fan for providing thrust to reduce the velocity of the aircraft during landing roll-out and/or taxiing.

The component may comprise an aircraft electrical system.

The apparatus may further comprise a controller configured to vary load on the generator to vary the landing gear's resistance to rotation.

The controller may be configured to receive runway condition information, and to vary the load on the generator using the received runway condition information to prevent skidding of the landing gear on the runway.

The controller may be configured to receive runway exit location information, and to vary the load on the generator using the received runway exit location information to enable the aircraft to exit the runway at a predetermined location and/or velocity.

The generator may comprise a motor-generator for receiving electrical energy from an auxiliary power unit of the aircraft to provide torque to the landing gear for taxiing.

The controller may be configured to receive engine warm-up information, and to vary the load on the generator using the received engine warm-up information to enable the aircraft to taxi at a predetermined speed.

According to various, but not necessarily all, embodiments there is provided an aircraft comprising apparatus as described in any of the preceding paragraphs.

According to various, but not necessarily all, embodiments there is provided a method for controlling velocity of aircraft comprising a landing gear during landing roll-out and/or taxiing, the method comprising: varying load on a generator to vary resistance to rotation of the landing gear, the generator being arranged to absorb kinetic energy from the landing gear to generate electrical energy, a component of the aircraft being arranged to receive and consume electrical energy from the generator, the generator and the component being electrically connected to one another without an intervening electrical energy storage device.

The method may further comprise: receiving runway condition information, and varying the load on the generator using the received runway condition information to prevent skidding of the landing gear on the runway.

The method may further comprise receiving runway exit location information, and varying the load on the generator using the received runway exit location information to enable the aircraft to exit the runway at a predetermined location and/or velocity.

The generator may comprise a motor-generator and the method may further comprise controlling an auxiliary power unit of the aircraft to provide electrical energy to the motor-generator to cause the motor-generator to provide torque to the landing gear for taxiing.

The method may further comprise receiving engine warm-up information. The method may further comprise varying the load on the generator using the received engine warm-up information to enable the aircraft to taxi at a predetermined speed.

According to various, but not necessarily all, embodiments there is provided a computer program that, when read by a computer, causes performance of the method as described in any of the preceding paragraphs.

According to various, but not necessarily all, embodiments there is provided a non-transitory computer readable storage medium comprising computer readable instructions that, when read by a computer, cause performance of the method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
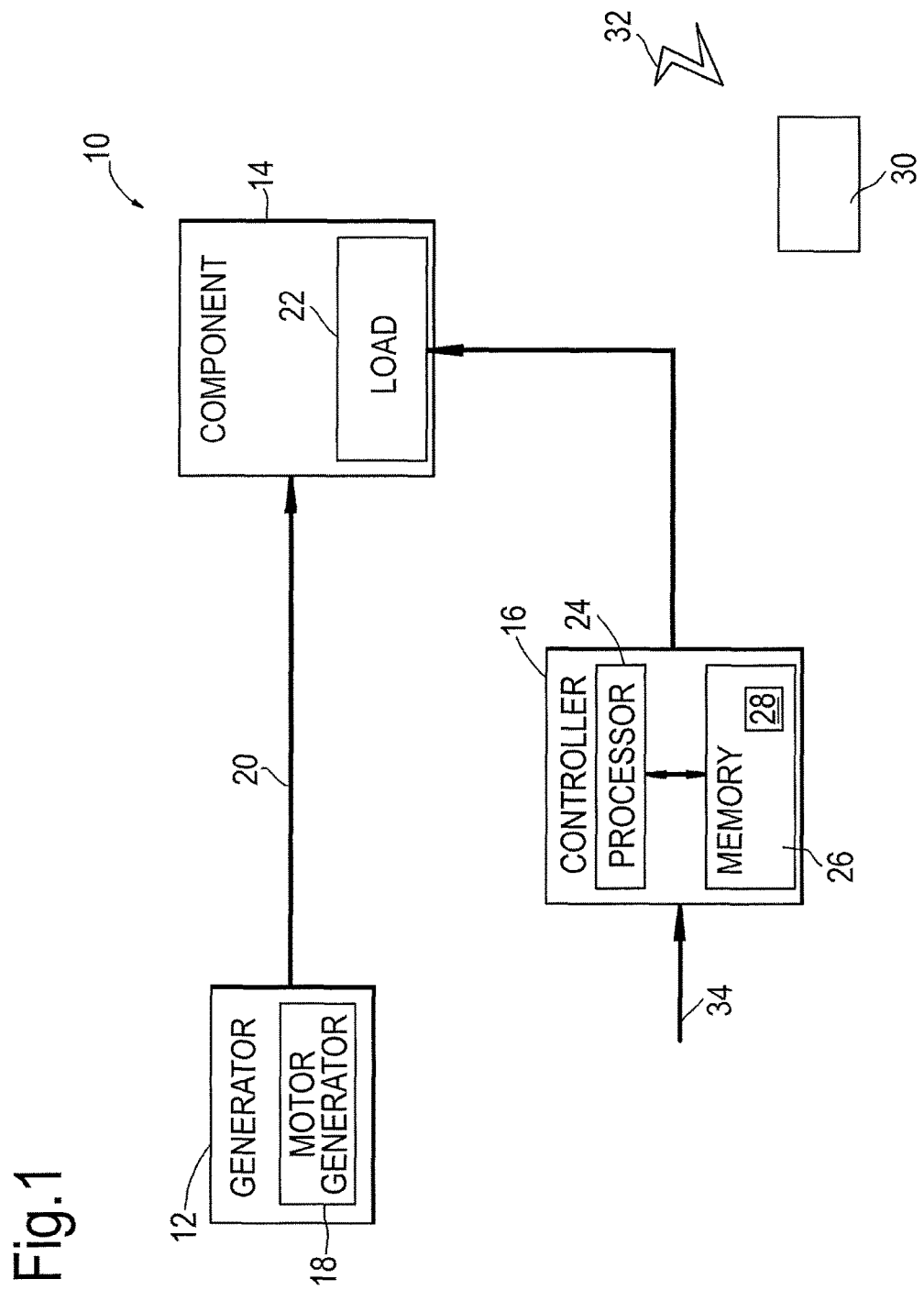
FIG. 1 illustrates a schematic diagram of apparatus for controlling velocity of an aircraft during landing roll-out and/or taxiing according to various examples.

FIG. 1 illustrates a schematic diagram of apparatus 10 for controlling velocity of aircraft during landing roll-out and/or taxiing according to various examples. The apparatus 10 includes a generator 12, a component 14 of the aircraft, and a controller 16. In some examples, the apparatus 10 may be a module. As used herein, the wording 'module' refers to a device or apparatus where one or more features are included at a later time, and possibly, by another manufacturer or by an end user. For example, where the apparatus 10 is a module, the apparatus 10 may only include the generator 12 and the component 14, and the remaining features (such as the controller 16) may be added by another manufacturer, or by an end user.

The generator 12 is arranged to absorb kinetic energy from a landing gear of the aircraft to generate electrical energy. For example, the generator 12 may form part of the landing gear and be arranged around a wheel shaft. In some examples, the generator 12 may include a motor-generator 18 that is arranged to receive electrical energy (from an auxiliary power unit (APU) of the aircraft for example) and provide torque to the wheels of the landing gear to cause them to rotate.

The component 14 may be any component of the aircraft that consumes electrical energy. For example, the component 14 may include one or more electrical fans for providing thrust to the aircraft (as part of a distributed propulsion system for example). By way of another example, the component 14 may include electric supplementary drive to the fan of a turbofan. By way of another example, the component 14 may include one or more aircraft electrical system such as an interior lighting system, an air conditioning system, one or more zonal dryer or dehumidifier, an avionics system, one or more galley heating system, one or more galley refrigeration system, one or more exterior light or lamp, and/or one or more pump for a fluid or fluids such as fuel, hydraulic fluid or water.

The component 14 is arranged to receive electrical energy from the generator 12 and consume the received electrical energy. The generator 12 and the component 14 are electrically connected to one another without an intervening electrical energy storage device (such as a battery or a supercapacitor). For example, the generator 12 and the component 14 are interconnected by a wired connection 20 that does not include an electrical energy storage device.

The component 14 presents a load 22 to the generator 12. In some examples, the load 22 presented to the generator 12 may be variable. For example, where the component 14 includes one or more electrical fans, the load 22 may be varied by changing the electrical power consumed by the electrical fans. By way of another example, where the component 14 includes an aircraft electrical system, the load 22 may be varied by changing the electrical power consumed by the electrical system.

The generator 12 may be directly electrically connected to the component 14 via the wired connection 20 (in other words, there are no electrical/electronic components connected between the generator 12 and the component 14). In other embodiments, the generator 12 may be indirectly electrically connected to the component 14 via the wired connection 20 (in other words, one or more electrical/electronic components may be connected between the generator 12 and the component 14 via the wired connection 20).

Figure 4:
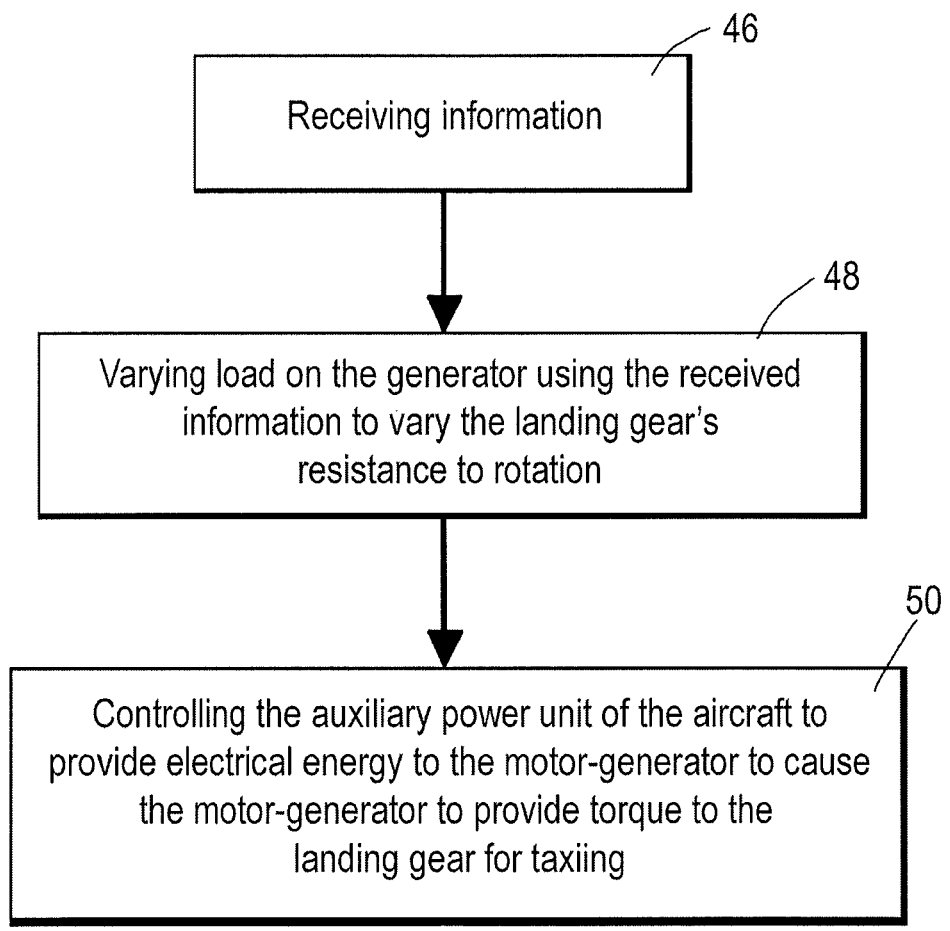
FIG. 4 illustrates a flow diagram of a method of controlling velocity of aircraft during landing roll-out and/or taxiing according to various examples.

The controller 16 may comprise any suitable circuitry to cause performance of the methods described herein and as illustrated in FIG. 4. The controller 16 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controller (PLC); and/or at least one microprocessor; and/or at least one microcontroller; and/or a central processing unit (CPU); and/or a graphics processing unit (GPU), to perform the methods.

By way of an example, the controller 16 may comprise at least one processor 24 and at least one memory 26. The memory 26 stores a computer program 28 comprising computer readable instructions that, when read by the processor 24, causes performance of the methods described herein, and as illustrated in FIG. 4. The computer program 28 may be software or firmware, or may be a combination of software and firmware.

The computer program 28 may be stored on a non-transitory computer readable storage medium 30. The computer program 28 may be transferred from the non-transitory computer readable storage medium 30 to the memory 26. The non-transitory computer readable storage medium 30 may be, for example, a USB flash drive, a compact disc (CD), a digital versatile disc (DVD) or a Blu-ray disc. In some examples, the computer program 28 may be transferred to the memory 26 via a signal 32 (which may be a wireless signal or a wired signal).

As described in greater detail in the following paragraphs with reference to FIGS. 2 and 3, the controller 16 is configured to receive information 34 and then vary the load 22 presented to the generator 12. Varying the load 22 presented to the generator 12 causes variation in the resistance of the landing gear to rotation. In particular, as the load 22 on the generator 12 increases, the landing gear's resistance to rotation increases (since an increased amount of kinetic energy in the landing gear is converted into electrical energy), thus causing an increased braking effect on the aircraft. As the load 22 on the generator 12 decreases, the landing gear's resistance to rotation decreases (since a reduced amount of kinetic energy in the landing gear is converted into electrical energy), thus causing a reduced braking effect on the aircraft.

Figure 2:
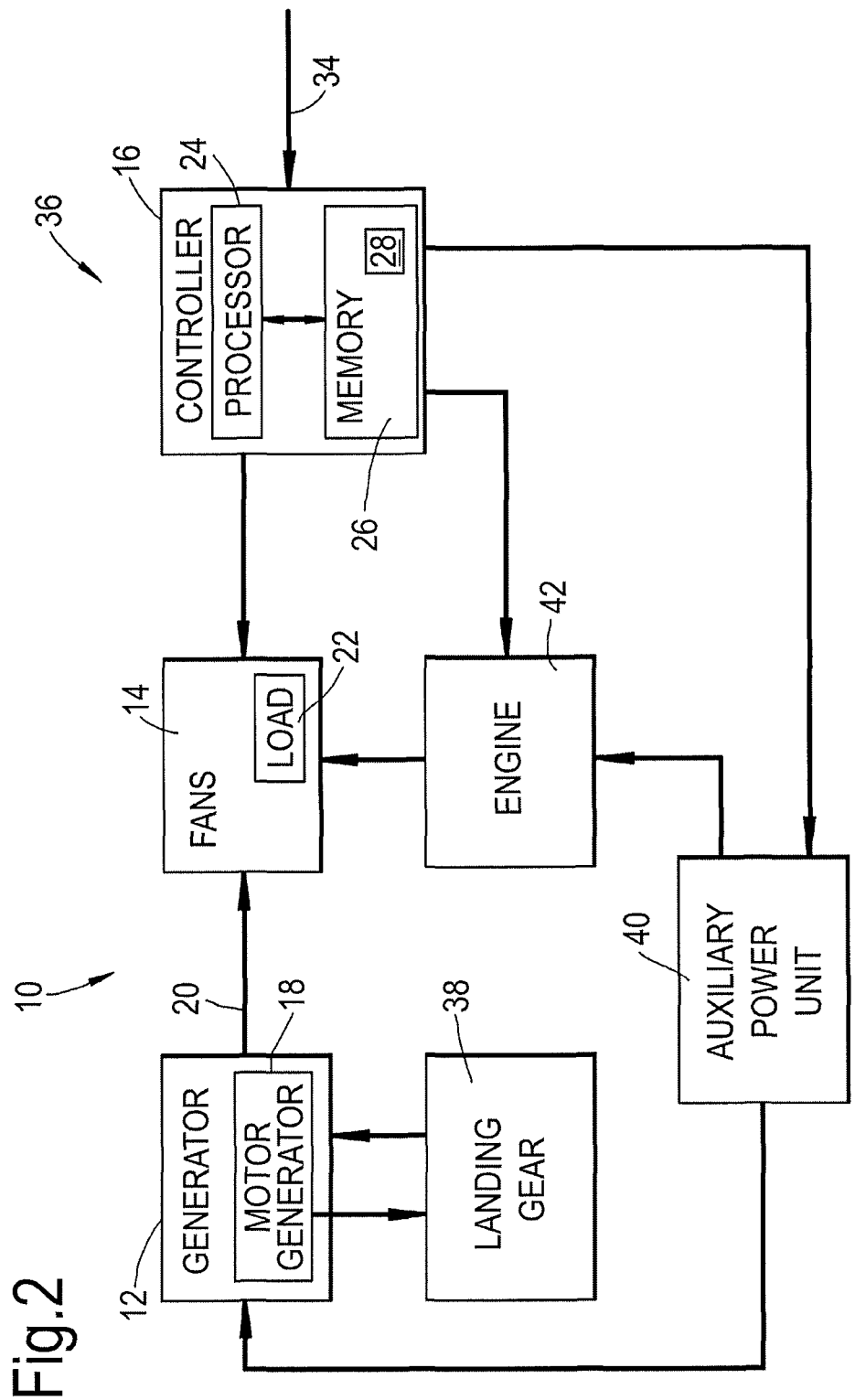
FIG. 2 illustrates a schematic diagram of an aircraft including apparatus for controlling velocity of the aircraft during landing roll-out and/or taxiing according to various examples.

FIG. 2 illustrates a schematic diagram of an aircraft 36 including: the apparatus 10; a landing gear 38; an auxiliary power unit (APU) 40; and an engine 42.

The component 14 comprises one or more electrically driven fans that may be arranged along the wings of the aircraft 36. The electrically driven fans 14 may rotate in a first direction (clockwise for example) to provide forward thrust to the aircraft 36, and may be arranged to rotate in a second direction (anti-clockwise for example) to provide reverse thrust to the aircraft 36. Reverse thrust may additionally or alternatively be provided by changing the pitch of the fan blades instead of changing the direction of fan rotation. In some examples, the component 14 may additionally comprise one or more electrical systems of the aircraft 36.

The landing gear 38 is positioned underneath the aircraft 36 and is arranged to support the aircraft 36 while the aircraft 36 is on the ground. The landing gear 38 may be fixed in position relative to the fuselage of the aircraft 36 or may be at least partially retractable within the fuselage and/or wing of the aircraft 36. The landing gear 38 includes one or more wheels and may additionally include a brake arrangement. The motor-generator 18 is configured to provide torque to the landing gear 38 to rotate one or more wheels of the landing gear 38.

The auxiliary power unit (APU) 40 is arranged to provide electrical energy to the motor-generator 18 to enable the motor-generator 18 to provide torque to the landing gear 38. The auxiliary power unit 40 may also be arranged to provide electrical energy to the engine 42 (to start the engine 42 for example). The controller 16 may be configured to control the operation of the auxiliary power unit 40. For example, the controller 16 may be configured to control the auxiliary power unit 40 to provide electrical energy to the motor-generator 18.

The engine 42 may comprise any suitable engine or any suitable plurality of engines. For example, the engine 42 may comprise one or more gas turbine engines. The engine 42 is arranged to provide electrical energy to the plurality of fans 14 to cause the fans 14 to rotate and provide thrust to the aircraft 36. For example, where the engine 42 is a gas turbine engine, the engine 42 may comprise a generator that is coupled to a main shaft of the gas turbine engine and that is arranged to provide electrical energy to the fans 14. The engine 42 may be arranged to provide little to no thrust to the aircraft 36 (in other words, the engine 42 may only be provided to generate electrical energy for the fans 14). The controller 16 is configured to control the operation of the engine 42. For example, the controller 16 may be configured to control the quantity of fuel provided to the engine 42 and thereby control the electrical power output by the engine 42.

During landing roll-out (that is, after landing/touch-down, but prior to taxiing of the aircraft 36), the landing gear 38 rotates through contact with the runway. The rotation of the landing gear 38 causes the generator 12 to generate electrical energy. The fans 14 receive the electrical energy generated by the generator 12 and rotate to provide reverse thrust to the aircraft 36 (that is, the fans 14 provide thrust in a direction substantially opposite to the direction of movement of the aircraft 36 along the runway). The controller 16 may be configured to control the direction of rotation of the fans 14 to enable them to generate reverse thrust. Alternatively, the controller 16 may be configured to control the fans 14 to change the fan blade pitch to enable them to generate reverse thrust.

During landing roll-out, the apparatus 10 advantageously causes deceleration of the aircraft 36. First, the reverse thrust generated by the fans 14 causes the aircraft 36 to decelerate. Second, the load 22 presented to the generator 12 by the fans 14 causes the generator 12 to absorb kinetic energy from the landing gear 38 and thus cause the aircraft 36 to decelerate. The apparatus 10 may advantageously reduce wear on the brake arrangement during landing roll-out due to the deceleration provided by the apparatus 10. Additionally, the apparatus 10 may advantageously provide greater passenger comfort relative to an aircraft propelled by one or more gas turbine engines, due to reduced engine noise and vibration caused by the reverse thrust operation of the gas turbine engines.

Figure 3:
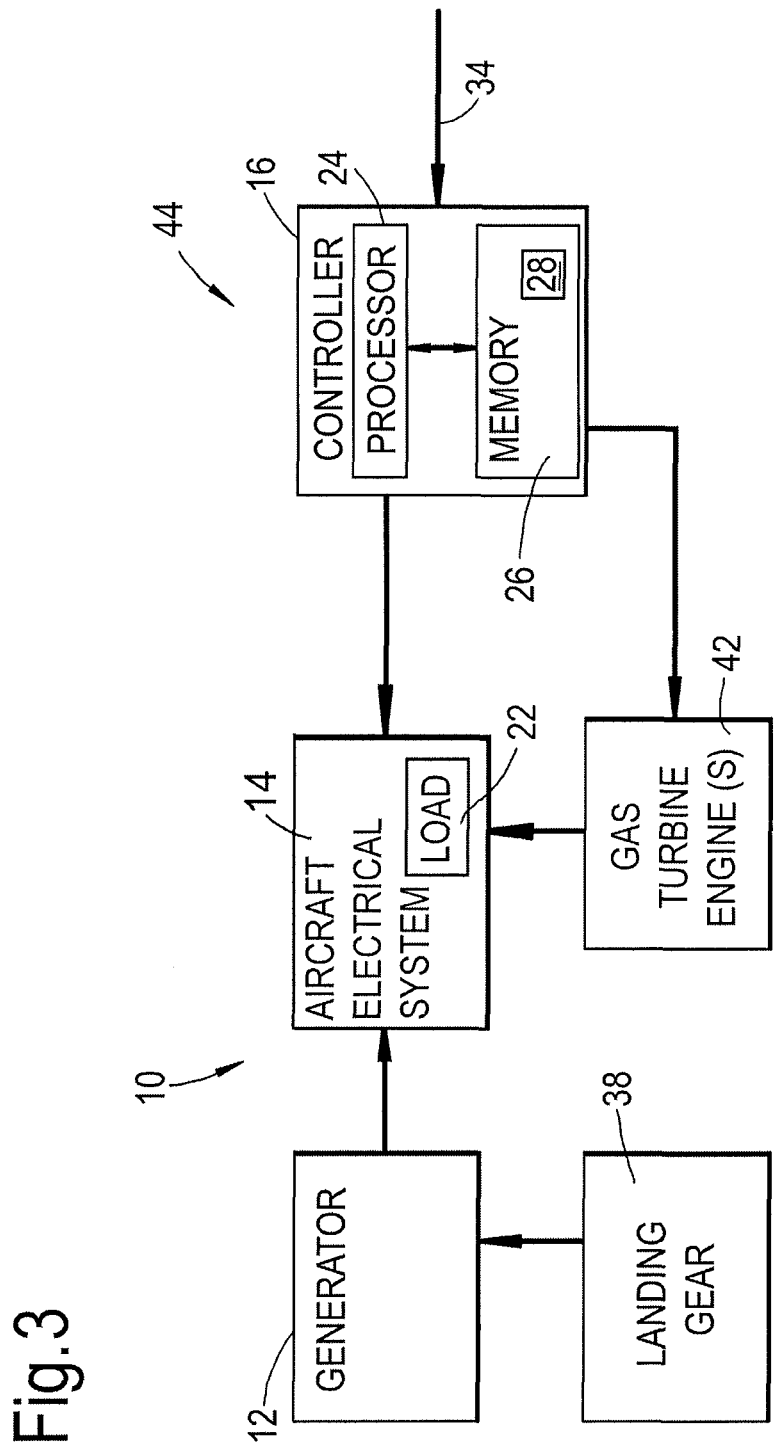
FIG. 3 illustrates a schematic diagram of another aircraft including apparatus for controlling velocity of the aircraft during landing roll-out and/or taxiing according to various examples.

FIG. 3 illustrates a schematic diagram of another aircraft 44 according to various examples. The aircraft 44 is similar to the aircraft 36 illustrated in FIG. 2 and where the features are similar, the same reference numerals are used. The aircraft 44 includes: apparatus 10; a landing gear 38; and one or more gas turbine engines 42 that are arranged to provide thrust to the aircraft 44.

The component 14 includes one or more aircraft electrical systems that present a load 22 to the generator 12. The one or more aircraft electrical systems 14 are also configured to receive electrical energy from the one or more gas turbine engines 42. For example, the aircraft electrical systems 14 may receive electrical energy from a generator that is coupled to an auxiliary gearbox of the gas turbine engine 42.

Warm-up of the one or more gas turbine engines 42 may be carried out while the aircraft 44 is taxiing at an airport. While the landing gear 38 rotates, the generator 12 generates electrical energy and provides the generated electrical energy to the aircraft electrical system 14. The absorption of kinetic energy by the generator 12 from the landing gear 38 may reduce and/or limit the velocity of the aircraft 44 while taxiing and may prevent the aircraft 44 from exceeding a threshold velocity while taxiing (such as an airport ground speed limit). This may advantageously reduce or eliminate the use of the brake arrangement of the landing gear 38 during taxing.

The apparatus 10 may provide a continuous or periodic management of the velocity of the aircraft 44. Where the velocity management is continuous, the apparatus 10 may advantageously increase passenger comfort relative to an aircraft where velocity is managed through periodic application of the wheel brakes.

The electrical energy received from the generator 12 may advantageously enable offloading of the generator of the gas turbine engine 42, thus allowing a lower rate of fuel flow to the gas turbine engine 42, whilst maintaining the desired engine rotational speed for engine warm-up.

FIG. 4 illustrates a flow diagram of a method of controlling velocity of aircraft 36, 44 during landing roll-out and/or taxiing according to various examples.

At block 46, the method includes receiving information. For example, the controller 16 may receive information from a user input device operated by a pilot of the aircraft 36, 44. In other examples, the controller 16 may receive information from an air traffic control system.

The information may be runway condition information. For example, the information may indicate whether and to what degree the runway is wet, covered in ice, or covered in snow. Additionally or alternatively, the information may be runway exit location information. For example, the information may indicate a predetermined location and/or velocity at which the aircraft is to exit the runway and enter the taxiway of the airport. Additionally or alternatively, the information may be engine warm-up information. For example, the information may indicate that the gas turbine engine is to be warmed up or is being warmed up.

At block 48, the method includes varying the load 22 on the generator 12 using the information received at block 46 to vary the resistance to rotation of the landing gear 38. For example, the controller 16 may control the load 22 presented to the generator 12 by the fans 14 (as illustrated in FIG. 2) to increase or decrease the absorption of kinetic energy from the landing gear 38 by the generator 12. By way of another example, the controller 16 may control the load 22 presented to the generator 12 by one or more of the aircraft's electrical systems (as illustrated in FIG. 3), to increase or decrease the absorption of kinetic energy from the landing gear 38 by the generator 12.

Where the information received at block 46 is runway condition information, the controller 12 may vary the load 22 on the generator 12 using the information to prevent the landing gear 38 from skidding on the runway. For example, where the runway condition information indicates that there is a layer of surface water on the runway, the controller 12 may reduce the load 22 on the generator 12 to reduce the severity of the braking caused by the generator 12 and thus prevent the landing gear 38 from skidding.

Where the information received at block 46 is runway exit location information, the controller 12 may vary the load 22 on the generator 12 using the information to enable the aircraft 36, 44 to exit the runway at a predetermined location and/or velocity and enter the taxiway of the airport. For example, where the runway exit location information indicates a predetermined runway exit location that is a significant distance from the location of touchdown/landing by the aircraft 36, 44, the controller 12 may reduce the load 22 on the generator 12 to reduce the severity of braking caused by the generator 12 (and reduce reverse thrust where the component 14 comprises one or more fans as illustrated in FIG. 2) and thus enable the aircraft 36, 44 to use the velocity from landing to reach the predetermined runway exit location. This may advantageously reduce or eliminate the need to use the fans 14, the gas turbine engines 42, or the motor-generator 18 to propel the aircraft 36, 44 to the predetermined runway exit location.

Where the information received at block 46 is engine warm-up information, the controller 12 may vary the load 22 on the generator 12 using the information to enable the aircraft 44 to taxi at a desired velocity (and/or below a threshold velocity). For example, where the warm-up of the gas turbine engines 42 results in the taxiing velocity of the aircraft 44 exceeding a threshold velocity (such as an airport ground speed limit), the controller 12 may increase the load 22 on the generator 12 to increase the severity of braking caused by the generator 12 so that the velocity of the aircraft 44 is maintained at or below the threshold velocity.

At block 50, the method includes controlling the auxiliary power unit 40 of the aircraft 36 to provide electrical energy to the motor-generator 18 to provide torque to the landing gear 38 for taxiing. For example, the controller 16 may send control signals to the auxiliary power unit 40 to provide electrical energy to the motor-generator 18 to provide torque to the landing gear 38 for taxiing. The controller 16 may vary the control signal to the auxiliary power unit 40 to vary the taxiing velocity of the aircraft 36. Block 50 may be performed subsequent to block 48 to enable the aircraft 36 to taxi, following the landing roll-out.

It will be understood that the invention is not limited to the embodiments above-described and various modifications and improvements can be made without departing from the concepts described herein.

Figure 5:
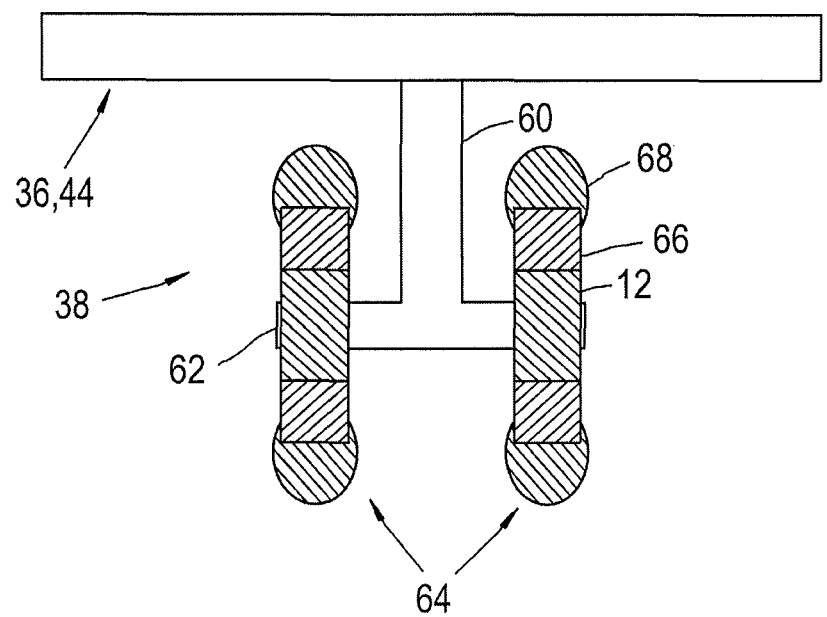
FIG. 5 illustrates a schematic front view diagram of a landing gear and a generator according to various examples.
Figure 6:
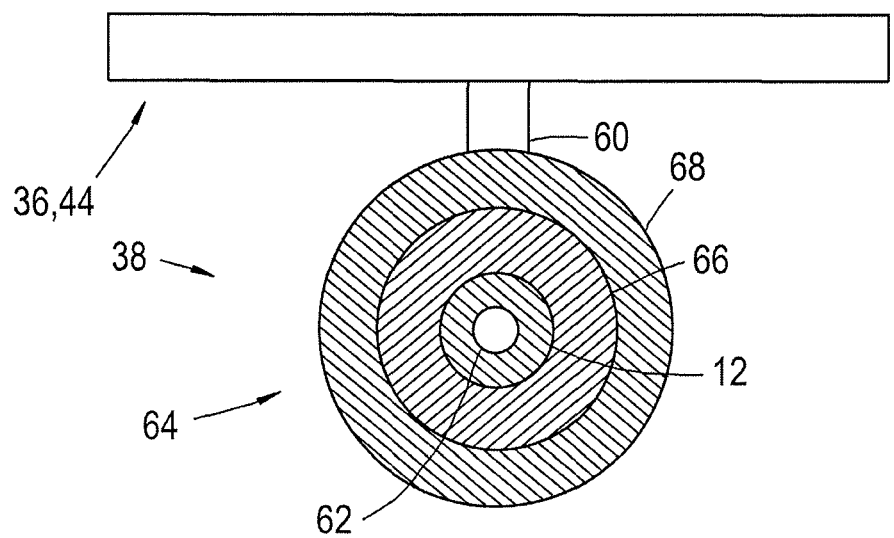
FIG. 6 illustrates a schematic side view diagram of the landing gear and generator illustrated in FIG. 5.

For example, FIGS. 5 and 6 illustrate an example of an arrangement of a generator 12 and a landing gear 38 according to various examples. The landing gear 38 comprises a strut 60 which is fixed to, and supports the weight of, the aircraft 36, 44. To the strut 60 is attached an arm, support, or non-rotating shaft 62, onto which is mounted a wheel assembly 64 comprising the generator 12, a wheel 66 which concentrically surrounds the generator 12, and a tyre 68 which concentrically surrounds the wheel 66. The generator 12 is drivingly connected to the wheel 66 (and vice versa), while the wheel 66 is drivingly connected to the tyre 68 (and vice versa) such that the wheel assembly 64 rotates as one about the arm, support, or non-rotating shaft 62. In the example shown there are two arms, supports, or non-rotating shafts 62, one on each side of the strut 60, each arm, support, or non-rotating shaft 62 acting as the axis of rotation for the corresponding wheel assembly 64. It will be understood that the aircraft may comprise multiple landing gears 38, each supporting a proportion of the aircraft's weight.

By way of another example, the aircraft 36 may not comprise the controller 16. The apparatus 10 may operate autonomously because the rate of energy production by the generator 12 decreases (and thus the level of reverse thrust produced by the fans 14) as the velocity of the aircraft 36 along the ground decreases.

By way of a further example, the aircraft 44 illustrated in FIG. 3 may additionally include an auxiliary power unit (APU) for powering up the gas turbine engines 42.

By way of another example, the engine 42 illustrated in FIG. 2 may comprise (or consist of) a fuel cell.

Except where mutually exclusive, any of the features may be employed separately or in combination with any other features and the disclosure extends to and includes all combinations and sub-combinations of one or more features described herein.

What is claimed is:

1. Apparatus for controlling velocity of aircraft during landing roll-out and/or taxiing, the apparatus comprising:
   a generator for absorbing kinetic energy from a landing gear of the aircraft to generate electrical energy; and
   a component of the aircraft for receiving and consuming electrical energy from the generator, the generator and the component being electrically connected to one another without an intervening electrical energy storage device,
   wherein the component comprises at least one fan for providing thrust to reduce the velocity of the aircraft during landing roll-out and/or taxiing, and
   wherein the component is configured to vary a load on the generator by means of charging a power consumed by the at least one fan.

2. Apparatus as claimed in claim 1, wherein the component comprises an aircraft electrical system.

3. Apparatus as claimed in claim 1, further comprising a controller configured to vary the load on the generator to vary the landing gear's resistance to rotation.

4. Apparatus as claimed in claim 3, wherein the controller is configured to receive runway condition information, and to vary the load on the generator using the received runway condition information to prevent skidding of the landing gear on the runway.

5. Apparatus as claimed in claim 3, wherein the controller is configured to receive runway exit location information, and to vary the load on the generator using the received runway exit location information to enable the aircraft to exit the runway at a predetermined location and/or velocity.

6. Apparatus as claimed in claim 1, wherein the generator comprises a motor-generator for receiving electrical energy from an auxiliary power unit of the aircraft to provide torque to the landing gear for taxiing.

7. Apparatus as claimed in claim 3, wherein the controller is configured to receive engine warm-up information, and to vary the load on the generator using the received engine warm-up information to enable the aircraft to taxi at a predetermined speed.

8. An aircraft comprising apparatus as claimed in claim 1.

9. A method for controlling velocity of aircraft comprising a landing gear during landing roll-out and/or taxiing, the method comprising:
varying load on a generator to vary resistance to rotation of the landing gear, the generator being arranged to absorb kinetic energy from the landing gear to generate electrical energy, a component of the aircraft being arranged to receive and consume electrical energy from the generator, the generator and the component being electrically connected to one another without an intervening electrical energy storage device,
wherein the component comprises at least one fan for providing thrust to reduce the velocity of the aircraft during landing roll-out and/or taxiing, and
wherein the component varies the load on the generator by means of changing a power consumed by the at least one fan.

10. A method as claimed in claim 9, further comprising: receiving runway condition information, and varying the load on the generator using the received runway condition information to prevent skidding of the landing gear on the runway.

11. A method as claimed in claim 9, further comprising receiving runway exit location information, and varying the load on the generator using the received runway exit location information to enable the aircraft to exit the runway at a predetermined location and/or velocity.

12. A method as claimed in claim 9, wherein the generator comprises a motor-generator, the method further comprising controlling an auxiliary power unit of the aircraft to provide electrical energy to the motor-generator to cause the motor-generator to provide torque to the landing gear for taxiing.

13. A method as claimed in claim 9, further comprising receiving engine warm-up information, and varying the load on the generator using the received engine warm-up information to enable the aircraft to taxi at a predetermined speed.

14. Apparatus as claimed in claim 1, wherein the generator comprises a motor generator, the motor generator receiving electrical energy from an auxiliary power unit of the aircraft.

* * * * *

UNITED STATES PATENT AND TRADEMARK OFFICE
CERTIFICATE OF CORRECTION

| | | |
|---|---|---|
| PATENT NO. | : 10,308,353 B2 | Page 1 of 1 |
| APPLICATION NO. | : 15/097975 | |
| DATED | : June 4, 2019 | |
| INVENTOR(S) | : Peter Swann | |

It is certified that error appears in the above-identified patent and that said Letters Patent is hereby corrected as shown below:

In the Claims

Column 8, Claim 1, Line 41, "charging" should be ---changing---.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*